US009291806B2

(12) United States Patent
Holman et al.

(10) Patent No.: US 9,291,806 B2
(45) Date of Patent: Mar. 22, 2016

(54) BEAM PATTERN PROJECTOR WITH MODULATING ARRAY OF LIGHT SOURCES

(75) Inventors: Robert L. Holman, San Jose, CA (US); Matthew B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 589 days.

(21) Appl. No.: 13/529,991

(22) Filed: Jun. 21, 2012

(65) Prior Publication Data
US 2013/0343051 A1  Dec. 26, 2013

(51) Int. Cl.
*G03B 21/20* (2006.01)
*G03B 21/26* (2006.01)
*F21V 5/00* (2015.01)
*G02B 19/00* (2006.01)
*F21S 8/10* (2006.01)
*F21V 7/00* (2006.01)
*G02B 27/14* (2006.01)
(Continued)

(52) U.S. Cl.
CPC .......... *G02B 19/0066* (2013.01); *F21S 48/115* (2013.01); *F21S 48/1154* (2013.01); *F21S 48/1317* (2013.01); *F21S 48/1747* (2013.01); *F21V 5/04* (2013.01); *F21V 7/0083* (2013.01); *G02B 19/0028* (2013.01); *G02B 27/149* (2013.01); *F21Y 2101/02* (2013.01)

(58) Field of Classification Search
CPC ......................... H04N 9/3197; H01L 25/0753
USPC ........................ 353/85, 94, 43, 102; 313/500; 362/296.01, 326, 244, 245
See application file for complete search history.

(56) References Cited

U.S. PATENT DOCUMENTS

| 7,310,186 | B2 | 12/2007 | Lerner et al. |
| 7,357,530 | B2 | 4/2008 | Wang et al. |
| 7,403,332 | B2 | 7/2008 | Whitehead et al. |

(Continued)

FOREIGN PATENT DOCUMENTS

| DE | 102008061556 A1 | 9/2009 |
| EP | 2461086 A1 | 6/2012 |

(Continued)

OTHER PUBLICATIONS

Bogaert, et al., "Analysis of Two Novel Concepts for Multiview Three-Dimensional Displays Using One Projector", Optical Engineering [Online], vol. 49, Issue 12, Dec. 2010 127401:1-127401:9.

(Continued)

*Primary Examiner* — William C Dowling
*Assistant Examiner* — Ryan Howard
(74) *Attorney, Agent, or Firm* — Knobbe, Martens, Olson & Bear, LLP (57) ABSTRACT

This disclosure provides systems, methods and apparatus for a beam pattern projection device that includes a modulating array of light sources. In one aspect, the beam pattern projection device may include a lens. The array of light sources can be positioned such that its output plane is substantially one focal length away from the lens along the optical axis. The output of the array of light sources can be controllable to create an adjustable beam pattern out of a plurality of possible beam patterns that are each associated with a power level of each light source in the array of light sources. The device can project at a distance the adjustable beam pattern created by the array of light sources.

32 Claims, 5 Drawing Sheets

(51) Int. Cl.
*F21V 5/04* (2006.01)
*F21Y 101/02* (2006.01)

(56) References Cited

U.S. PATENT DOCUMENTS

| | | |
|---|---|---|
| 7,404,644 B2 | 7/2008 | Evans et al. |
| 7,604,355 B1 | 10/2009 | Peng |
| 7,659,971 B2 | 2/2010 | Warden et al. |
| 7,670,006 B2 | 3/2010 | Lieberman |
| 8,047,660 B2 | 11/2011 | Penn et al. |
| 2004/0263346 A1 | 12/2004 | Neal |
| 2005/0157263 A1 | 7/2005 | Sakata et al. |
| 2005/0174771 A1 | 8/2005 | Conner |
| 2006/0002141 A1 | 1/2006 | Ouderkirk et al. |
| 2006/0170883 A1* | 8/2006 | Matsui ............... 353/85 |
| 2008/0037271 A1* | 2/2008 | Grace et al. ............... 362/551 |
| 2009/0002985 A1 | 1/2009 | Peck et al. |
| 2009/0185141 A1 | 7/2009 | Chen et al. |
| 2010/0053959 A1 | 3/2010 | Ijzerman et al. |
| 2010/0141905 A1 | 6/2010 | Burke |
| 2011/0002019 A1 | 1/2011 | Routley et al. |
| 2011/0096570 A1 | 4/2011 | Vissenberg et al. |
| 2011/0116051 A1* | 5/2011 | Young et al. ............... 353/31 |
| 2011/0205049 A1 | 8/2011 | Kmetec |
| 2011/0260178 A1 | 10/2011 | Bierhuizen |
| 2012/0002256 A1 | 1/2012 | Lacoste et al. |
| 2012/0038693 A1 | 2/2012 | Kang et al. |
| 2013/0343053 A1 | 12/2013 | Holman |

FOREIGN PATENT DOCUMENTS

| | | |
|---|---|---|
| JP | 2008-210712 A | 9/2008 |
| WO | 2008123283 A1 | 10/2008 |

OTHER PUBLICATIONS

International Search Report and Written Opinion—PCT/US2013/046162—ISA/EPO—Sep. 4, 2013.
International Search Report and Written Opinion—PCT/US2013/046167—ISA/EPO—Sep. 24, 2013.
Gotoda, Hironobu, "Reduction of Image Blurring in an Autostereoscopic Multilayer Liquid Crystal Display", Proceedings of SPIE-IS&T Electronic Imaging, SPIE vol. 7863, 2011, pp. 786321-1-786321-7.

* cited by examiner

FIG. 6

BEAM PATTERN PROJECTOR WITH MODULATING ARRAY OF LIGHT SOURCES

TECHNICAL FIELD

This disclosure relates to light projectors including, for example, compact light engines for use in directional lighting applications.

DESCRIPTION OF THE RELATED TECHNOLOGY

Directional lighting systems are often used for illuminating displays. They also find use in architectural, theatrical, and other applications. For example, directional lighting systems can be used in stores to illuminate product displays, or in museums and art galleries to frame objects of interest. They can also be used to provide accent lighting in buildings or overhead spotlights in theatrical productions. Typically, if the aim, beam pattern, spot size, brightness, or some other property of such a directional lighting system is to be reconfigured, a human operator must physically access the lighting system to make such adjustments. This can be inconvenient in cases where, for example, the directional lighting system is located out of reach or is otherwise difficult to physically access.

SUMMARY

The systems, methods and devices of the disclosure each have several innovative aspects, no single one of which is solely responsible for the desirable attributes disclosed herein.

Innovative aspects of the subject matter described in this disclosure can be implemented in a beam pattern projection device comprising: a lens, the lens having a focal length and an optical axis; and a first array of light sources having an output plane that is positioned substantially one focal length away from the lens along the optical axis, the output of the first array of light sources being controllable to create a first adjustable beam pattern out of a first plurality of possible beam patterns, each of the first plurality of possible beam patterns being associated with a power level of each light source in the first array of light sources, wherein the device is configured to project at a distance the first adjustable beam pattern created by the first array of light sources. The first array of light sources can include a first array of corresponding etendue-preserving reflectors. Each of the light sources in the first array of light sources can be independently controllable, for example, between an ON state and an OFF state.

In another implementation, a beam pattern projection device comprises: light production means for controllably creating a plurality of beams of light to form a first beam pattern out of any of a plurality of beam patterns; and focusing means for reducing the divergence of the plurality of beams of light that are created by the light production means, the focusing means being associated with a focal length, and the focusing means being positioned one focal length away from the light production means to substantially collimate each of the plurality of beams of light, wherein the device is configured to project at a distance whichever of the plurality of beam patterns is created by the light production means.

In another implementation, a method of fabricating a beam pattern projection device, the method comprises: providing a lens having a focal length and an optical axis; providing an array of light sources having an output plane, the output of the array of light sources being controllable to create any of a plurality of beam patterns; and disposing the output plane of the array of light sources substantially one focal length away from the lens along the optical axis such that the device is capable of projecting at a distance whichever of the first plurality of beam patterns is created by the array of light sources.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following detailed description is directed to certain implementations for the purposes of describing various innovative aspects. However, the teachings herein can be applied in a multitude of different ways.

Various implementations of a beam pattern projector are described herein. The beam pattern projector can include, for example, a modulating array of light sources and a field lens. The modulating array of light sources and the field lens can be arranged such that the output plane of the array of light sources is substantially one focal length away from the field lens along its optical axis. The output of the array of light sources can be controllable to create an adjustable beam pattern out of a plurality of possible beam patterns that are each associated with a power level of each light source in the array of light sources. The device can project at a distance the beam pattern, which is created by the array of light sources.

The beam pattern projectors described herein can be, for example, compact light emitting diode (LED) light engines that can produce a diverse group of far field beam patterns by, for example, electronic switching of the light array rather than by movement or replacement of physical optics. Such illumination systems are of value in, for example, directional lighting applications where replacement or adjustment of the projector or physical accessories is inconvenient. In addition, the beam pattern projectors described herein do not require refocusing for different applications. As an example, it would normally be inconvenient to refocus or to change beam pattern-making optics for track-mounted light fixtures located high above the ground, such as those used in various directional lighting applications. However, using the beam pattern projectors described herein, the beam pattern can be remotely controlled and the focus of the beam pattern is relatively constant regardless of the distance between the projector and the object-to-be-illuminated.

Figure 1:
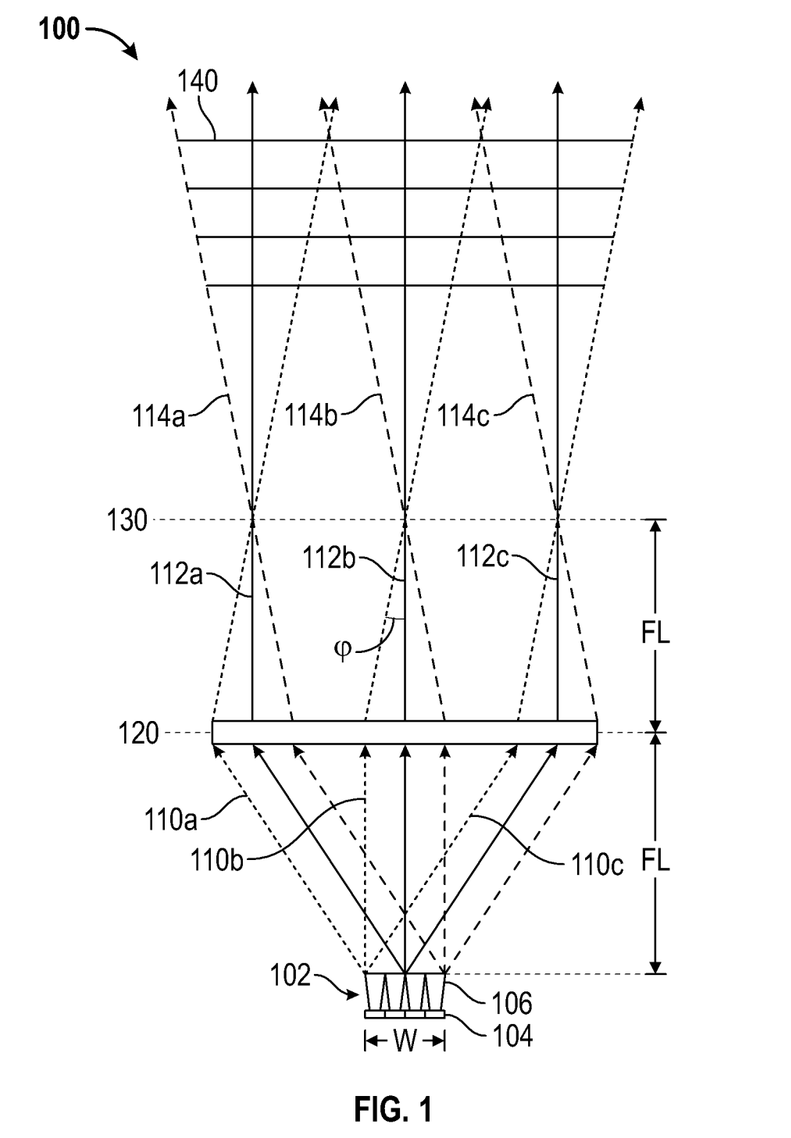
FIG. 1 is a schematic illustration of an example of a beam pattern projector having a modulating array of light sources.

FIG. 1 is a schematic illustration of an example of a beam pattern projector 100 having a modulating array of light sources 102. The array of light sources 102 can have, for example, a two-dimensional lattice structure. Each light source can include a light emitter 104 and a corresponding reflector 106. Each light emitter 104 can be, for example, an LED, though other light emitters can also be used. For example, other surface emitting devices including, for example, organic LEDs (OLEDs), microcavity plasma emitters, remotely pumped phosphors and phosphor films, light extraction features on a light guide, etc., can also serve as light emitters. In some implementations, the light emitters 104 are surface emitting LEDs which output light over a generally hemispherical range of angles. Each corresponding reflector 106 can be used to collect light from the range of angles at which light is emitted from a light emitter 104, and to direct the light toward a field lens 120. As discussed further herein, the light source array 102 can be controlled to create a variety of beam patterns 140 to be projected at a distance by the field lens 120. For example, individual light emitters 104 in the array 102 can be switched on or off, or dimmed by variable amounts, to create a wide variety of beam patterns that can be projected by the pattern projector 100.

The field lens 120 in the beam pattern projector 100 can be, for example, a positive power lens including one or more refractive or diffractive optical elements. The optical element(s) can include, for example, biconvex lens elements, plano-convex lens elements, meniscus lens elements, Fresnel lens elements, aspheric lens elements, etc. As illustrated in FIG. 1, the field lens 120 has a focal length, FL. For reference purposes, an optical axis can be defined as the longitudinal axis that passes through the optical center of the field lens 120.

In some implementations, the field lens 120 is positioned substantially one focal length, FL, away from the output plane of the array of light sources 102 along the optical axis. For example, the field lens 120 can be positioned substantially one focal length, along the optical axis, away from the plane in which the emitting aperture of each reflector 106 is located. This relationship between the array of light sources 102 and the field lens 120 establishes a projection condition, which is schematically shown in FIG. 1. In some implementations, the placement of the field lens 120 will be close to, but not necessarily exactly at, one focal length away from the output plane of the array of light sources 102 so that the beam pattern is in focus not nearer than 100 times the focal length of the field lens 120, or not nearer than 200 times the focal length, or not nearer than 500 times the focal length. In some implementations, the field lens is disposed one focal length away from the output plane of the array light sources 102 to within manufacturing tolerances. In some implementations, the field lens is disposed substantially one focal length away from the output plane of the array of light sources to within 1%, 2%, or 5% of the focal length. In situations where the surface onto which the beam pattern 140 is intended to be projected is at a fixed distance from the field lens 120, relay and/or projection lens approaches (i.e., additional relay lenses can be added to the system) can be used to alter the focal plane of the optical system to the intended surface.

For purposes of illustration, three different groups of three light rays are shown emanating from different areas of the array of light sources 102. A group of three dotted rays (110a, 110b, and 110c) are shown emanating from the left-hand portion of the array of light sources 102, while a group of three solid rays (112a, 112b, and 112c) emanate from the middle of the array of light sources 102, and a group of three dashed rays (114a, 114b, and 114c) emanate from the right-hand portion of the LED array. As mentioned above, the output plane of the array of light sources 102 is located substantially one focal length away from the field lens 120. Thus, the field lens 120 collimates beams of light (110 [110a, 110b, and 110c], 112 [112a, 112b, and 112c], and 114 [114a, 114b, and 114c], respectively) from the array of light sources 102, and projects a beam pattern 140 (or an illumination pattern created by the spatial cross-section of the beams) to infinity.

For example, as illustrated in FIG. 1, the three solid rays (112a, 112b, and 112c) emanating from the middle of the array of light sources 102 are collimated and emerge from the field lens 120 substantially parallel in the vertical direction. The three dotted rays (110a, 110b, and 110c) from the left-hand side of the array of light sources 102 are collimated and emerge from the field lens 120 as parallel rays that are angularly offset from the vertical optical axis to the right, while the three dashed rays (114a, 114b, and 114c) from the right-hand side of the array of light sources 102 are collimated and emerge from the field lens 120 as parallel rays that are angularly offset to the left of the optical axis.

Moreover, the light rays emanating from each portion of the array of light sources 102 are averaged at each point in the field lens's output focal plane 130. Accordingly there is no useful image at the output focal plane 130. For example, as shown in FIG. 1, light rays 110a, 112a, and 114a are each averaged at a point in the output focal plane 130, while the same is true for light rays 110b, 112b, and 114b, and for light rays 110c, 112c, and 114c, respectively. A continuum of effective point sources are created at the output focal plane 130 of the field lens 120, each radiating light in fixed angular cones, and each having a constant far field projection angle, φp, equaling arctan[(W/2)/FL], where W is the aperture width of the array of light sources 102 and arctan is the arc tangent function.

The far field projection angles, φ, of the beams of light 110, 112, and 114 in the meridian that is illustrated in FIG. 1 depend on the width, W, of the emitting portion of the array of light sources 102 in that meridian. Similarly, the far field projection angles in the orthogonal meridian (not shown) depend on the width W' of the emitting portion of the array of light sources 102 in that meridian (which may or may not be the same as W). When W=W,' the projected beam pattern 140 may be generally square-shaped (depending upon the shape of the array of light sources 102). When W does not equal W,' the projected beam pattern 140 may become generally rectangular-shaped. Whether square or rectangular, however, the optical uniformity is particular even because of the spatial averaging that occurs at the output focal plane of the field lens 120, where each point represents an average of all emitting points within the array of light sources 120.

In this way, the field lens 120 projects at a distance the beam pattern 140 created by the emitting area of the array of light sources 102. In some implementations, beams of light produced by the array of light sources 102 are not focused at a focal plane that is a finite distance from the field lens 120. Since the beams of light 110, 112, and 114 are substantially collimated by the field lens 120, the illumination pattern that they create maintains a similar appearance regardless of the distance from the projector 100 (though the illumination pattern does increase in size with increasing distance from the projector).

As a result of the collimated beams 110, 112, and 114 which exit the field lens 120, the beam pattern projector 100 can be simplified because it does not require a mechanism for changing its focus distance. Thus, in some implementations, the beam pattern projector 100 does not include any mechanism for adjusting the focus of the projector, for example, by altering the distance between the field lens 120 and the array of light sources 102. In some implementations, the field lens 120 and the array of light sources 102 are fixed with respect to one another by, for example, a housing. In addition, in order to make for a compact design, in some implementations the beam pattern projector 100 does not include additional optical components apart from the light emitters 104, reflectors 106, and field lens 120.

In some implementations suitable for a microprojector, for example, the array of light sources can be made to be very small. For example, the array of light emitters 104 could be shaped in a square (or a circle) with a side (diameter) having a dimension from about 50 microns to about 6 mm. In some implementations, the array of light emitters 104 can have a dimension, such as a side or a diameter, less than 6 mm. As one illustrative example of a relatively small LED or OLED array, each LED could be about 10 microns in size, and the array can be formed in a 5 by 5 arrangement. In various microprojector implementations, the reflectors 106 could include a microstructure of reflectors having a reflector height ranging from about 50 microns to 12 mm. For a microprojector implementation, the lens diameter may range from, for example, 200 microns to 12 mm, with a focal length ranging from, for example, 500 microns to 12 mm. In one implementation, a microprojector can include a compact flashlight with a controllable beam pattern, or a controllable illuminator for controllably illuminating different portions of a keyboard of a laptop, for example. In some larger implementations, more suitable for commercial or theatrical lighting environments, the lens diameter may range from, for example, about 12 mm to about 305 mm (~12 inches), with a focal length ranging from, for example, about 12 mm to about 610 mm (~24 inches). For such an implementation, the array of light emitters 104 could be shaped in a square (or a circle) with a side (diameter) having a dimension, for example, from about 6 mm to about 51 mm (~2 inches). Reflectors 106 can range in height from, for example, 12 mm to about 152 mm (~6 inches). With such compact designs, a beam projector can be provided that is, for example, 50% to 15% of the size of conventional lighting solutions providing similar brightness and illumination.

Figure 2:
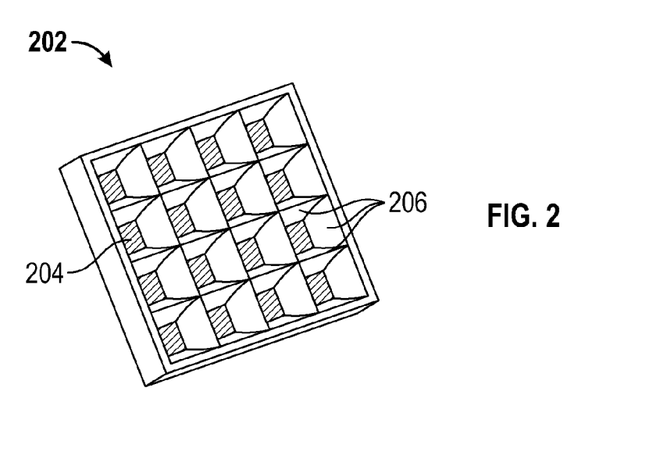
FIG. 2 is a perspective view of an example of an array of light sources that includes a plurality of light emitters with a corresponding plurality of reflectors.

FIG. 2 is a perspective view of an example of an array of light sources 202 that includes a plurality of light emitters 204 with a corresponding plurality of reflectors 206. The array of light sources 202 is an example implementation of the array of light sources 102 that is schematically illustrated in FIG. 1. In the illustrated implementation, the array of light sources 202 is made up of a 4×4 two-dimensional array of individual light emitters 204, though a variety of different numbers and arrangements of light emitters can be used. As already discussed, the light emitters 204 can be, for example, LEDs. In some implementations, each light emitter 204 has a corresponding reflector 206. For example, each light emitter 204 can be positioned within a reflector. In some implementations, each reflector 206 includes one or more reflective sidewalls made up of, for example, metallic or dielectric material.

The reflective sidewalls can extend from the boundaries of the corresponding light emitter 204. The reflective sidewalls can be shaped to direct all, or substantially all, of the light from a light emitter 204 toward the field lens 120. The reflectors 206 may also be designed to homogenize the light that is incident upon the field lens 120.

In some implementations, the reflectors 206 are etendue-preserving reflectors. In other words, each reflector 206 is etendue-matched to the corresponding light emitter 204. For example, each reflector 206 can be configured so as to substantially match the angular spread of the output beam of light from its corresponding light emitter 204 to the acceptance cone of the field lens 120. In addition, the reflectors 206 can be configured so as to substantially match the diameter of the beams from the light emitters 204, at the point where they are incident upon the field lens 120, to the clear aperture of the field lens. The specific shape of the sidewalls of a reflector 206 in any given implementation may be dependent upon, for example, the emitting pattern of the corresponding light emitter 204, the distance to the field lens 120, etc. In some implementations, since the reflectors 206 are etendue-matched to the corresponding light emitters 204, the reflectors 206 can reduce or eliminate wasted light by forming beams whose spatial and angular extent are such that all, or substantially all, of the light from the light emitters 204 falls within the acceptance cone of the field lens 120 and passes through its clear aperture. In this way, the etendue-preserving reflectors 206 increase the efficiency of the projector.

Although in some implementations it may be possible to use other optical components besides the reflectors 206 to direct light from the light emitters 204 towards the field lens 120, the reflectors 206 have the advantageous capability of being able to process relatively wide-angle light from the light emitters 204 and to effectively direct it toward the field lens 120. For example, in the case where each light emitter 204 emits light over a hemispherical range of angles, it may be difficult to capture all of that light with other types of optical components, such as lenses, and direct it towards the field lens 120. Unfortunately, any light from a light emitter 204 that does not reach the clear aperture of the field lens 120, at an angle that is within the acceptance cone of the field lens 120, does not contribute to the useful formation of a beam pattern 140. Thus, the efficiency of the projector is reduced due to this lost light. The reflectors 206, however, are able to process wide-angle light and effectively direct it to the field lens 120, thus increasing efficiency.

Figure 3:
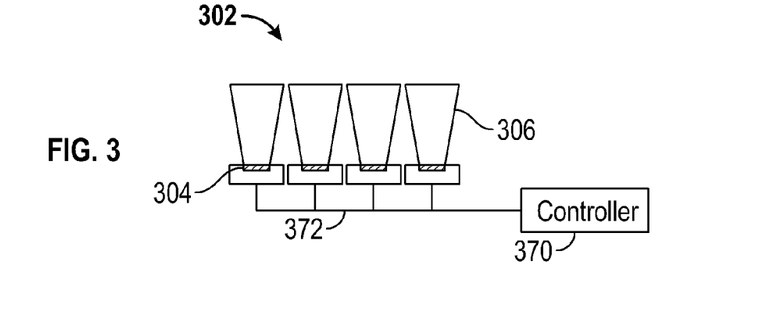
FIG. 3 is a cross-sectional schematic illustration of an example of an array of light sources that includes a plurality of light emitters with a corresponding plurality of reflectors, and a controller for selectively and independently varying the power level of each light emitter.

FIG. 3 is a cross-sectional schematic illustration of an example of an array of light sources 302 that includes a plurality of light emitters 304 with a corresponding plurality of reflectors 306, and a controller 370 for selectively and independently varying the power level, and, hence, brightness, of each light emitter 304. The array of light sources 302, with the controller 370, is an example implementation of the array of light sources illustrated elsewhere herein (for example, 102 in FIG. 1). The controller 370 can be used to selectively and independently set the power level of the individual light emitters 304 in the array 302 (for example, via the control lines 372), thus allowing for the creation of a variety of light patterns using the array of light sources 302. For example, the power level of each individual light emitter 304 can be controlled by switching between an ON state (full power) and an OFF state (zero power). Alternatively, the power level of each individual light emitter 304 can have several discrete power values, or even a continuous range of power values between the ON and OFF states. By switching the individual light emitters 304 to different power values, a wide variety of beam patterns can be created. This can be done, for example, electronically and remotely without physically accessing or manipulating the optics of the projector 100.

In some implementations, the controller 370 includes a receiver with, for example, a wired or wireless interface for receiving remote command signals. The controller 370 can process a command signal and then control the light emitters 304 to have power states to form a beam pattern that corresponds to the received command signal. In some implementations, the receiver interface of the controller 370 may be communicatively coupled with a remote control device via the Internet, Bluetooth, Wi-Fi (Institute of Electrical and Electronics Engineers (IEEE) 802.11 standards), etc. In addition, the remote device can be a computer (e.g., desktop, laptop, tablet, etc.), a cell phone, etc.

Figure 4:
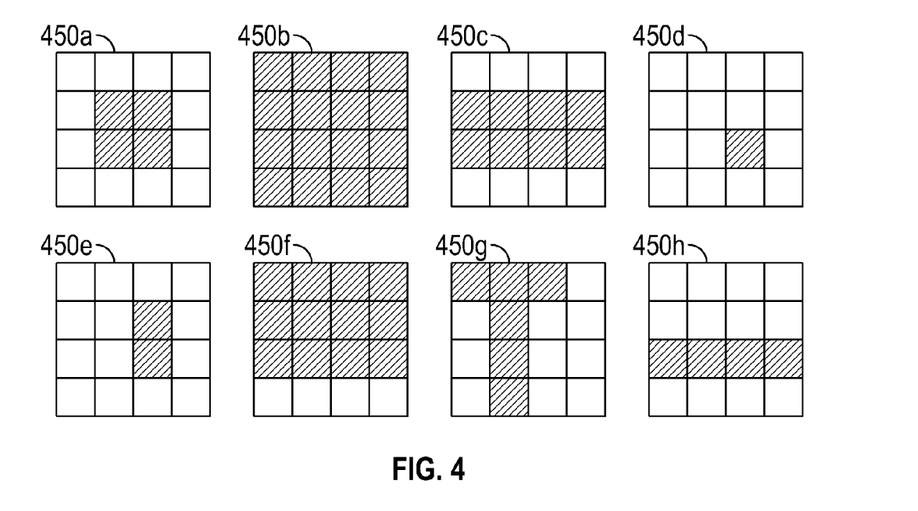
FIG. 4 is a schematic illustration of examples of a plurality of illumination patterns that can be created by the beam pattern projector of, for example, FIG. 1.

FIG. 4 is a schematic illustration of examples of a plurality of illumination patterns 450a-450h that can be created by, for example, the beam pattern projector 100 of FIG. 1. The illumination patterns 450a-450h are examples of those created by the spatial cross-section of the beam patterns illustrated elsewhere herein (for example, beam pattern 140 in FIG. 1). The illumination patterns represent the projection (to distances from the projector 100) of the beam patterns produced by the array of light sources 102. In each of the illumination patterns 450a-450h, each square corresponds to an individual light source in an array of light sources (for example, array of light sources 102 in FIG. 1). The shaded squares correspond to light sources that are switched ON, while the blank squares correspond to light sources that are switched OFF (though it should be understood that various light sources could also be switched to an intermediate power value between ON and OFF). For example, the illumination pattern 450b may represent a flood beam of light. The illumination pattern 450d can represent a spotlight pattern. The size and location of the spotlight pattern can be altered by switching on a different light source in the array. The illumination pattern 450g illustrates that irregular patterns such as a "T" shape can also be projected. Of course, even more detailed higher-resolution illumination patterns can be projected if the number of light sources in the array is increased.

As just mentioned, in some applications, different individual light sources in the array of light sources (for example, array of light sources 102 in FIG. 1) can be turned on/off (or brightened/dimmed) to create an electronically controlled spotlight, or multiple simultaneous spotlights, with the size and shape of each spotlight controlled by the number of contiguous light sources in each meridian that are switched on or off. For a given focal length, the width of the actual emitting portion of the array of light sources controls the beam width of the spotlight. Specifically, the narrower the emitting width, the narrower the beam angle. Similarly, the wider the emitting width, the wider the beam angle. When the whole aperture of the array of light sources is lit, the spotlight pattern can be a wide one. When only a portion of the aperture of the array of light sources is lit, the beam is a narrower pattern than the wide beam pattern. When all of the light sources in the array are switched on, the spot pattern floods the widest possible area (for a given projector configuration of light sources and lens). When only a single light source within the array is switched on, the spot pattern is the narrowest it can be for a given projector configuration. In some applications, different light sources in the array can be turned on/off (or brightened/dimmed) to project light to different portions of a room (e.g., to illuminate different seating positions at a conference table, while not illuminating other seating positions). In other applications, different light sources can be turned on/off to highlight various aspects of, for example, a commercial product display or a museum exhibit.

This method of creating illumination patterns may be more efficient than doing so by, for example, backlighting a spatial light modulator (e.g., an image created by an interferometric modulator array, liquid crystal display (LCD), stencil, or other mask) because only the light emitters that are needed to contribute to the desired illumination pattern 450a-450h are turned on, while all the others can be turned off to save power. This has the additional feature of enabling each pattern to project with relatively constant brightness, generally regardless of how wide or narrow in extent.

In summary, the beam pattern projectors described herein (for example, beam pattern projector 100 in FIG. 1) can be used to produce a diverse group of far field illumination patterns by electronic switching of the light array rather than by movement or replacement of physical optics. As discussed herein, such illumination systems are of value in directional lighting applications where replacement or adjustment of physical accessories is inconvenient. In addition, the beam pattern projectors described herein do not require re-focusing for different applications. As an example, it would normally be inconvenient to refocus or to change beam pattern-making optics for track-mounted light fixtures located high above the ground, such as those used in various directional lighting applications. However, using the beam pattern projectors described herein, the beam pattern can be remotely controlled and the focus of the beam pattern is relatively constant regardless of the distance between the projector and the object-to-be-illuminated.

Figure 5A:
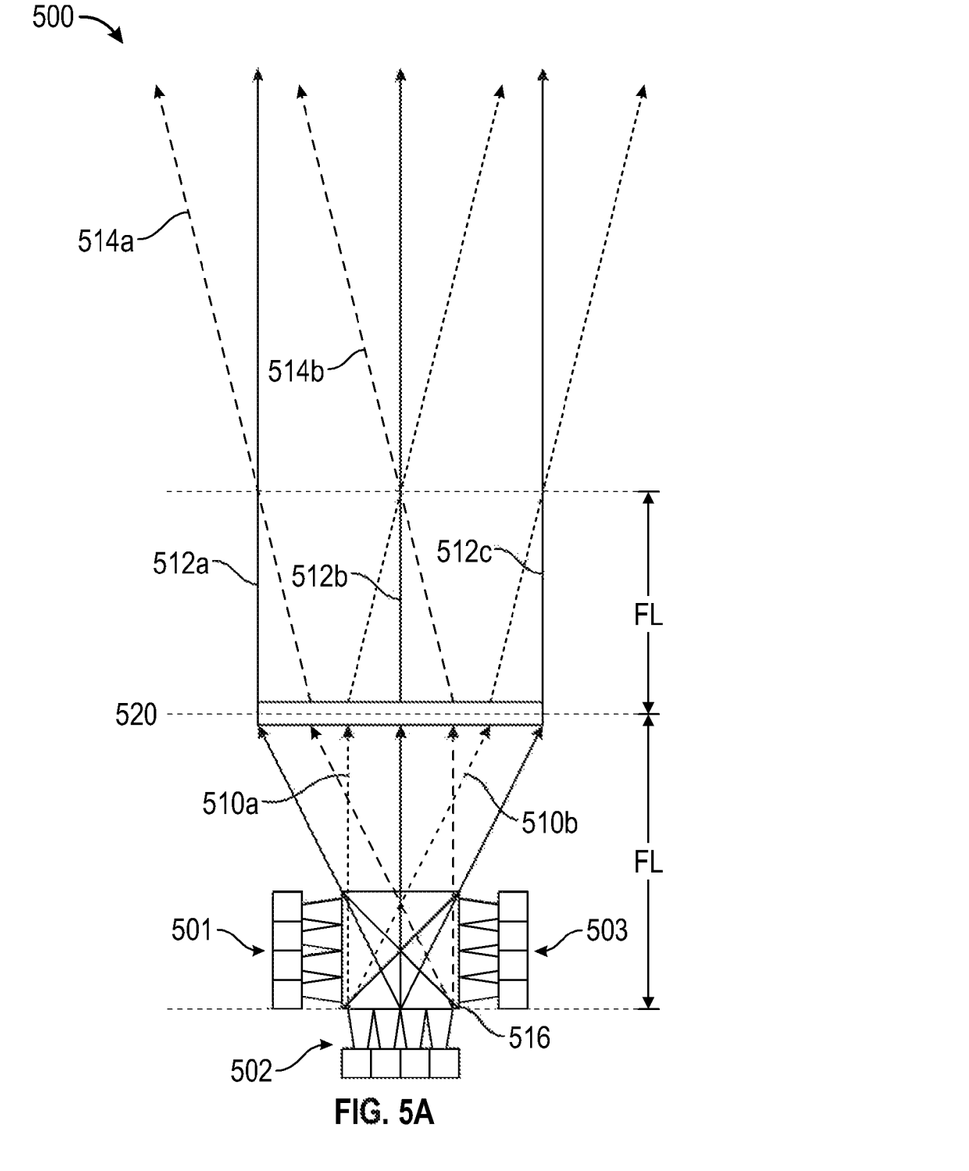
FIG. 5A is a schematic illustration of an example of a polychromatic beam pattern projector having a plurality of modulating arrays of light sources.
Figure 5B:
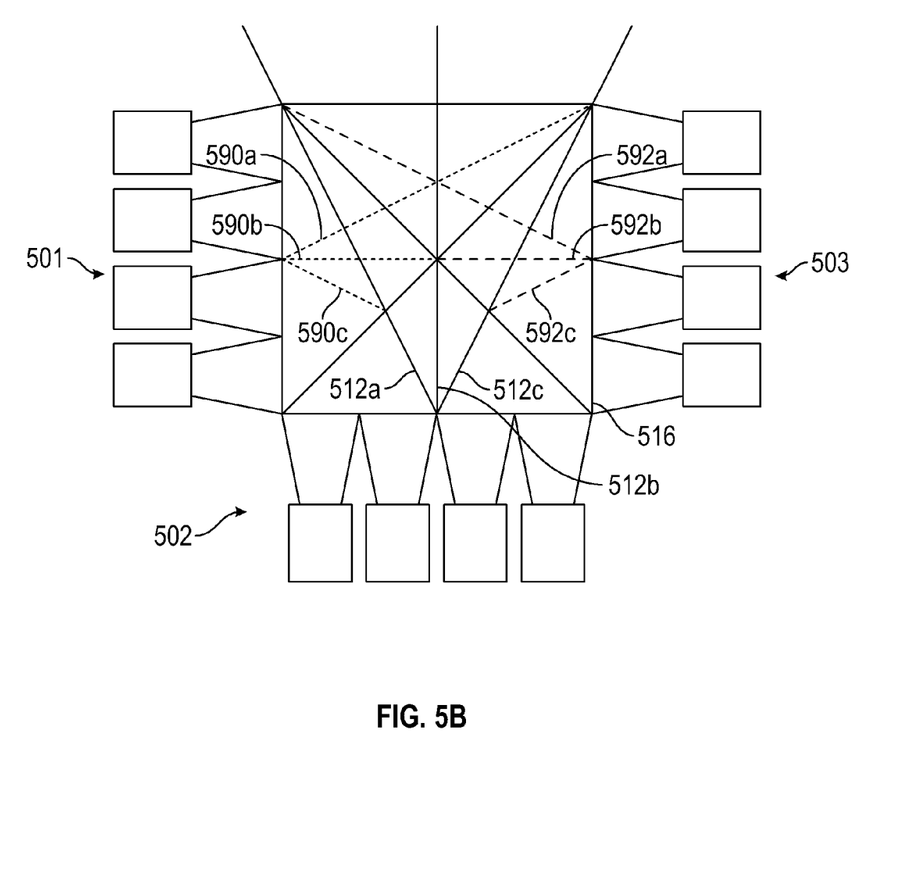
FIG. 5B is a schematic illustration of light rays inside a beamsplitter cube of the polychromatic beam pattern projector of FIG. 5A.

FIG. 5A is a schematic illustration of a polychromatic beam pattern projector 500 having a plurality of modulating arrays of light sources 501, 502, and 503. The projector 500 includes a first array of light sources 502 and a field lens 520 which are similar to those described herein (for example, array of light sources 102 and field lens 120, respectively, in FIG. 1). The first controllable array of light sources 502 emits various light beams of a first color 510 (510a and 510b), 512 (512a, 512b, and 512c), and 514 (514a and 514b), which are collimated by the field lens 520 to create a variety of beam patterns, as discussed herein. The projector 500 in FIG. 5A additionally includes, however, additional controllable rays of light sources 501 and 503, and a beam splitter cube 516 aligned along the optical axis of the field lens 520. The light rays from the controllable arrays of light sources 501 and 503 are not illustrated in FIG. 5A for the sake of clarity. However, the paths of such rays are understood in the art, and examples of the light rays in the beam splitter cube 516 are illustrated in FIG. 5B. The controllable arrays of light sources 501 and 503 can each include, for example, light emitters that emit light of second and third colors. The first color, the second color, and the third color can each be different colors (for example, having different hues). In some implementations, the controllable arrays of light sources 501, 502, and 503 emit red, green, and blue light, respectively, though other combinations of colors can also be used. The first color, the second color, and the third color can be selected to provide an appropriate color gamut, for example these colors can be three primary colors used to project full color images. In other implementations, some or all of the first color, the second color, and the third color can be the same color, which may provide increased brightness to the projected illumination pattern. Each of the controllable arrays of light sources 501, 502, and 503 can also include reflectors and controllers, as discussed herein (for example, in relation to the embodiment of FIG. 1).

In some implementations, each of the controllable arrays of light sources 501, 502, and 503 is positioned adjacent one input side of the beam splitter cube 516. In particular, each of the controllable arrays of light sources 501, 502, and 503 can be positioned such that the optical distance from the field lens 520 to each of their respective output planes is the focal length, FL, of the field lens (when accounting for the folded optical path of the beams of light from each array through the beam splitter cube, as well as the refractive index of the beam splitter cube). In this way, the field lens 520 collimates the beams of light from each of the arrays of light sources 501, 502, and 503, as discussed herein, thus creating overlapping beam patterns in the far field.

In some implementations, the light from each of the controllable arrays of light sources 501, 502, and 503 is projected to create a beam pattern of a distinct color (e.g., red, green, and blue). For example, in some implementations, a controller may control the array of light sources 501 to select a desired red beam pattern, while also controlling the array of light sources 502 to select a desired blue beam pattern, and controlling the array of light sources 503 to select a desired green beam pattern. Since these beam patterns are overlapping, full-color composite far field beam patterns can be created by appropriately controlling the power levels of each of the individual emitters in the arrays 501, 502, and 503.

FIG. 5B is a schematic illustration of light rays inside the beam splitter cube 516 of the polychromatic beam pattern projector 500 of FIG. 5A. FIG. 5B shows the controllable arrays of light sources 501, 502, and 503 adjacent the beam splitter cube 516. FIG. 5B also illustrates the paths of light rays 512*a*, 512*b*, and 512*c*, which originate near the center of the controllable array of light sources 502, as well as light rays 590*a*, 590*b*, and 590*c*, which originate near the center of the controllable array of light sources 501, and light rays 592*a*, 592*b*, and 592*c*, which originate near the center of the controllable array of light sources 503. As illustrated in FIG. 5B, the light rays 512*a*, 590*a*, and 592*a* become superimposed on one another and exit the beam splitter cube 516 as a single ray. The same is true of light rays 512*b*, 590*b*, and 592*b*, as well as light rays 512*c*, 590*c*, and 592*c*.

Figure 6:
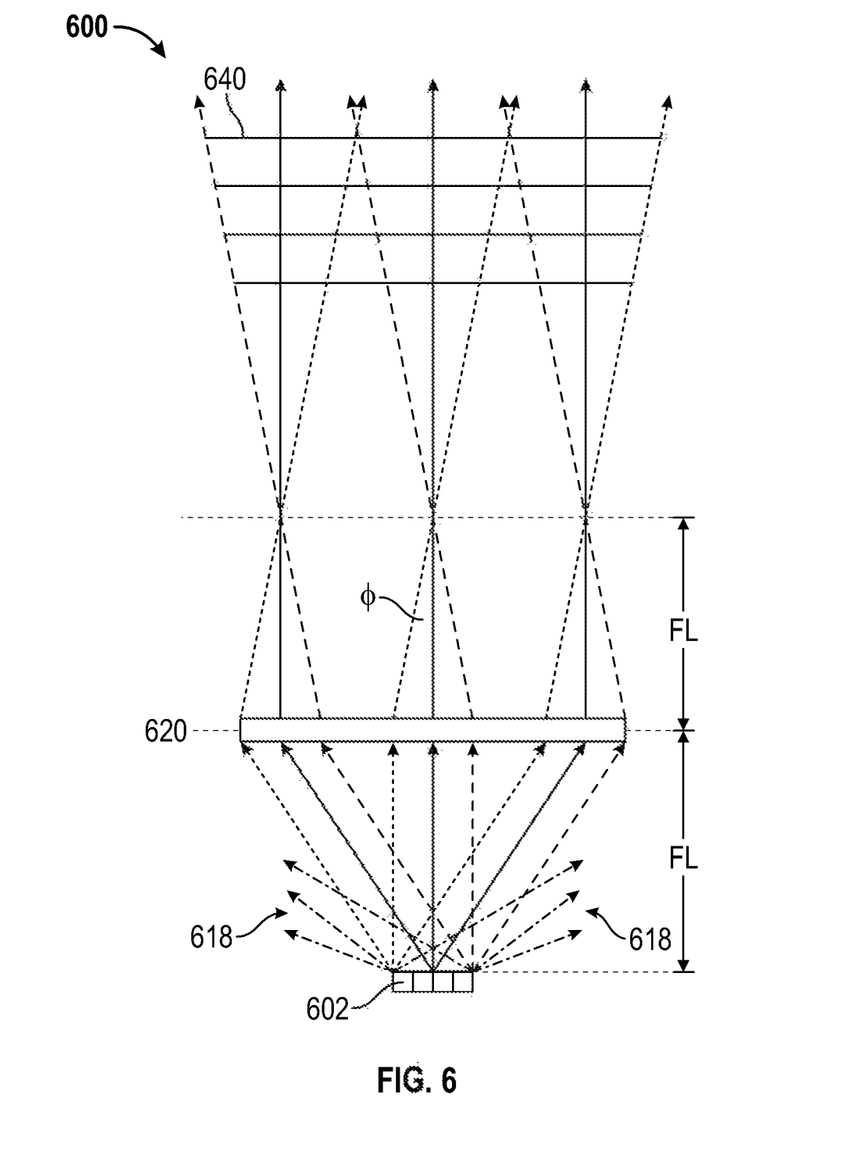
FIG. 6 is a schematic illustration of an example of a beam pattern projector having a modulating array of light sources without reflectors.

FIG. 6 is a schematic illustration of a beam pattern projector 600 having a modulating array of light sources 602 without reflectors. The modulating array of light sources 602 and the field lens 620 can be designed and arranged similarly to others described herein (e.g., 102 and 120, respectively, in FIG. 1). However, the projector 600 is simplified, as compared to others described herein (for example, 100 in FIG. 1), by eliminating the array of reflectors from the array of light sources 602. As a result of the absence of the array of reflectors, some light from the array of light sources 602 is wasted because it does not reach the clear aperture of the field lens 620. This is indicated in FIG. 6 by the wide-angle dash-dot rays 618. These light rays 618 are emitted from the array of light sources 602 at angles that are outside the angular aperture of the field lens. As such, these wasted light rays 618 do not pass through the field lens 620 and, therefore, do not contribute to formation of a beam pattern 640. While the optical design of the beam pattern projector 600 is simplified, and the cost reduced, by omitting an array of, for example, etendue-preserving reflectors, this is done at the expense of decreasing the efficiency of the device. However, this cost/efficiency tradeoff may be desirable in some applications.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A beam pattern projection device comprising:
a lens, the lens having a focal length and an optical axis; and
a first array of light sources having an output plane that is positioned substantially one focal length away from the lens along the optical axis such that light from each point on the output plane of the first array of light sources is substantially collimated by the lens, the output of the first array of light sources being controllable to create a first adjustable beam pattern out of a first plurality of possible beam patterns, each of the first plurality of possible beam patterns being associated with a power level of each light source in the first array of light sources,
wherein the device is configured to project at a distance the first adjustable beam pattern created by the first array of light sources,
wherein the first array of light sources includes a first array of corresponding reflectors, and
wherein there is a one-to-one correspondence between each of the light sources in the first array of light sources and each of the reflectors in the first array of reflectors.

2. The beam pattern projection device of claim 1, wherein one or more of the reflectors in the first array of reflectors include etendue-preserving reflectors.

3. The beam pattern projection device of claim 2, wherein the output plane of the first array of light sources corresponds to an output plane of the first array of etendue-preserving reflectors.

4. The beam pattern projection device of claim 1, wherein each reflector in the first array of reflectors is configured to substantially direct a beam of light from a corresponding light source into a clear aperture size of the lens.

5. The beam pattern projection device of claim 1, wherein each reflector in the first array of reflectors is configured to substantially direct a beam of light from a corresponding light source into an acceptance cone of the lens.

6. The beam pattern projection device of claim 1, wherein the device does not include a mechanism for adjusting the focus of the device.

7. The beam pattern projection device of claim 1, wherein the output of each of the light sources in the first array of light sources is independently controllable.

8. The beam pattern projection device of claim 7, wherein each of the light sources in the first array of light sources is independently controllable between an ON state and an OFF state.

9. The beam pattern projection device of claim 8, wherein each of the light sources in the first array of light sources is independently controllable to have a range of power levels between the ON state and the OFF state.

10. The beam pattern projection device of claim 1, further comprising a controller for controlling the output of the first array of light sources to select the first beam pattern out of the first plurality of possible beam patterns.

11. A beam pattern projection device of comprising:
a lens, the lens having a focal length and an optical axis;
a first array of light sources having an output plane that is positioned substantially one focal length away from the lens along the optical axis such that light from each point on the output plane of the first array of light sources is substantially collimated by the lens, the output of the first array of light sources being controllable to create a first adjustable beam pattern out of a first plurality of possible beam patterns, each of the first plurality of possible beam patterns being associated with a power level of each light source in the first array of light sources;
at least a second array of light sources positioned substantially one focal length away from the lens, the output of the second array of light sources being controllable to create a second beam pattern out of a second plurality of possible beam patterns; and
a combining optical element to combine the light from the first array of light sources and the light from the second array of light sources,
wherein the device is configured to project at a distance the first adjustable beam pattern created by the first array of light sources.

12. The beam pattern projection device of claim 11 wherein the combining optical element includes a beam splitter.

13. The beam pattern projection device of claim 11, wherein the light sources in the first array of light sources are configured to output light of a first color and the light sources in the second array of light sources are configured to output light of a second color that is different from the first color.

14. The beam pattern projection device of claim 11, wherein the second array of light sources includes a second array of corresponding reflectors.

15. The beam pattern projection device of claim 11, further comprising a controller for controlling the output of the first array of light sources to select the first beam pattern out of the first plurality of possible beam patterns, and for controlling the output of the second array of light sources to select the second beam pattern out of the second plurality of possible beam patterns.

16. A beam pattern projection device comprising:
a plurality of light production means for controllably creating any of a plurality of beams of light to form a near-field beam pattern; and
focusing means for reducing the divergence of the plurality of beams of light that are created by the plurality of light production means and transforming the plurality of beams so that a far field beam pattern corresponds to the near-field beam pattern, the focusing means being associated with a focal length, and the focusing means being positioned one focal length away from the light production means to substantially collimate each of the plurality of beams of light,
wherein the device is configured to project at a distance whichever of the plurality of beam patterns is created by the light production means,
wherein the plurality of light production means include a plurality of corresponding light reflection means for reflecting the light, and
wherein there is a one-to-one correspondence between each of the light production means and each of the light reflection means.

17. The beam pattern projection device of claim 16, wherein the plurality of light production means comprise an array of light sources, the focusing means comprises a lens, and the plurality of light reflection means comprise an array of etendue-preserving reflectors.

18. A method of fabricating a beam pattern projection device, the method comprising:
providing a lens having a focal length and an optical axis;
providing an array of light sources having an output plane, the output of the array of light sources being controllable to create any of a first plurality of beam patterns; and
disposing the output plane of the array of light sources substantially one focal length away from the lens along the optical axis such that light from each point on the output plane of the array of light sources is substantially collimated by the lens, and such that the device is capable of projecting at a distance whichever of the first plurality of beam patterns is created by the array of light sources,
wherein the first array of light sources includes a first array of corresponding reflectors, and
wherein there is a one-to-one correspondence between each of the light sources in the first array of light sources and each of the reflectors in the first array of reflectors.

19. The method of claim 18, wherein one or more of the reflectors in the first array of reflectors include etendue-preserving reflectors.

20. The method of claim 19, wherein the output plane of the first array of light sources corresponds to an output plane of the first array of etendue-preserving reflectors.

21. The method of claim 18, wherein each reflector in the first array of reflectors is configured to substantially direct a beam of light from a corresponding light source into a clear aperture size of the lens.

22. The method of claim 18, wherein each reflector in the first array of reflectors is configured to substantially direct a beam of light from a corresponding light source into an acceptance cone of the lens.

23. The method of claim 18, wherein the device does not include a mechanism for adjusting the focus of the device.

24. The method of claim 18, wherein the output of each of the light sources in the first array of light sources is independently controllable.

25. The method of claim 24, wherein each of the light sources in the first array of light sources is independently controllable between an ON state and an OFF state.

26. The method of claim 25, wherein each of the light sources in the first array of light sources is independently controllable to have a range of power levels between the ON state and the OFF state.

27. The method of claim 18, further comprising providing a controller for controlling the output of the first array of light sources to select a first beam pattern out of the first plurality of beam patterns.

28. A method of fabricating a beam pattern projection device the method comprising:
providing a lens having a focal length and an optical axis;
providing an array of light sources having an output plane, the output of the array of light sources being controllable to create any of a first plurality of beam patterns;
disposing the output plane of the array of light sources substantially one focal length away from the lens along the optical axis such that light from each point on the output plane of the array of light sources is substantially collimated by the lens, and such that the device is capable of projecting at a distance whichever of the first plurality of beam patterns is created by the array of light sources;
providing at least a second array of light sources;
positioning the second array of light sources substantially one focal length away from the lens, the output of the second array of light sources being controllable to create a second plurality of beam patterns; and
providing a combining optical element to combine the light from the first array of light sources and the light from the second array of light sources.

29. The method of claim 28, wherein the combining optical element includes a beam splitter.

30. The method of claim 28, wherein the first array light sources is configured to output light of a first color and the second array of light sources is configured to output light of a second color that is different from the first color.

31. The method of claim 28, wherein the second array of light sources includes a second array of corresponding reflectors.

32. The method of claim 28, further comprising providing a controller for controlling the output of the first array of light sources to select a first beam pattern out of the first plurality of beam patterns, and for controlling the output of the second array of light sources to select a second beam pattern out of the second plurality of beam patterns.

* * * * *